United States Patent [19]

Strassle

[11] 4,017,199
[45] Apr. 12, 1977

[54] ELASTICALLY-DEFORMED ADJUSTABLE T-JOINT

[75] Inventor: Marcel Strassle, Kirchberg, Switzerland

[73] Assignee: Syma Intercontinental S.A., Kirchberg, Switzerland

[22] Filed: Dec. 3, 1975

[21] Appl. No.: 637,210

[30] Foreign Application Priority Data

Dec. 9, 1974 Switzerland ............... 16319/74

[52] U.S. Cl. ............................ 403/264; 403/190
[51] Int. Cl.$^2$ .................. B25G 3/00; F16B 7/04; F16L 41/00
[58] Field of Search .......... 403/234, 237, 190, 264; 211/182; 52/758 H

[56] References Cited

UNITED STATES PATENTS

| 3,513,606 | 5/1970 | Jones ................ 211/182 X |
| 3,537,736 | 11/1970 | Kroopp ................ 403/171 |
| 3,672,710 | 6/1972 | Kroopp ................ 403/314 X |
| 3,840,124 | 10/1974 | Atwater ................ 211/182 |

FOREIGN PATENTS OR APPLICATIONS

| 448,527 | 10/1936 | United Kingdom ........... 403/234 |

*Primary Examiner*—Wayne L. Shedd
*Attorney, Agent, or Firm*—Lackenbach, Lilling & Siegel

[57] ABSTRACT

A frame comprising at least two sectional elements which are detachably interconnected and pressed against each other, the end-face and the outer surface of one of the sectional elements are differently shaped in such a manner that when the sectional elements are clamped together by a bolt, the end-face first bears against one of the sectional elements along lines of contact and rotation of the elements relative to each other is prevented, and upon further clamping, the vanes or rails bear against the end-face by becoming elastically deformed.

7 Claims, 14 Drawing Figures

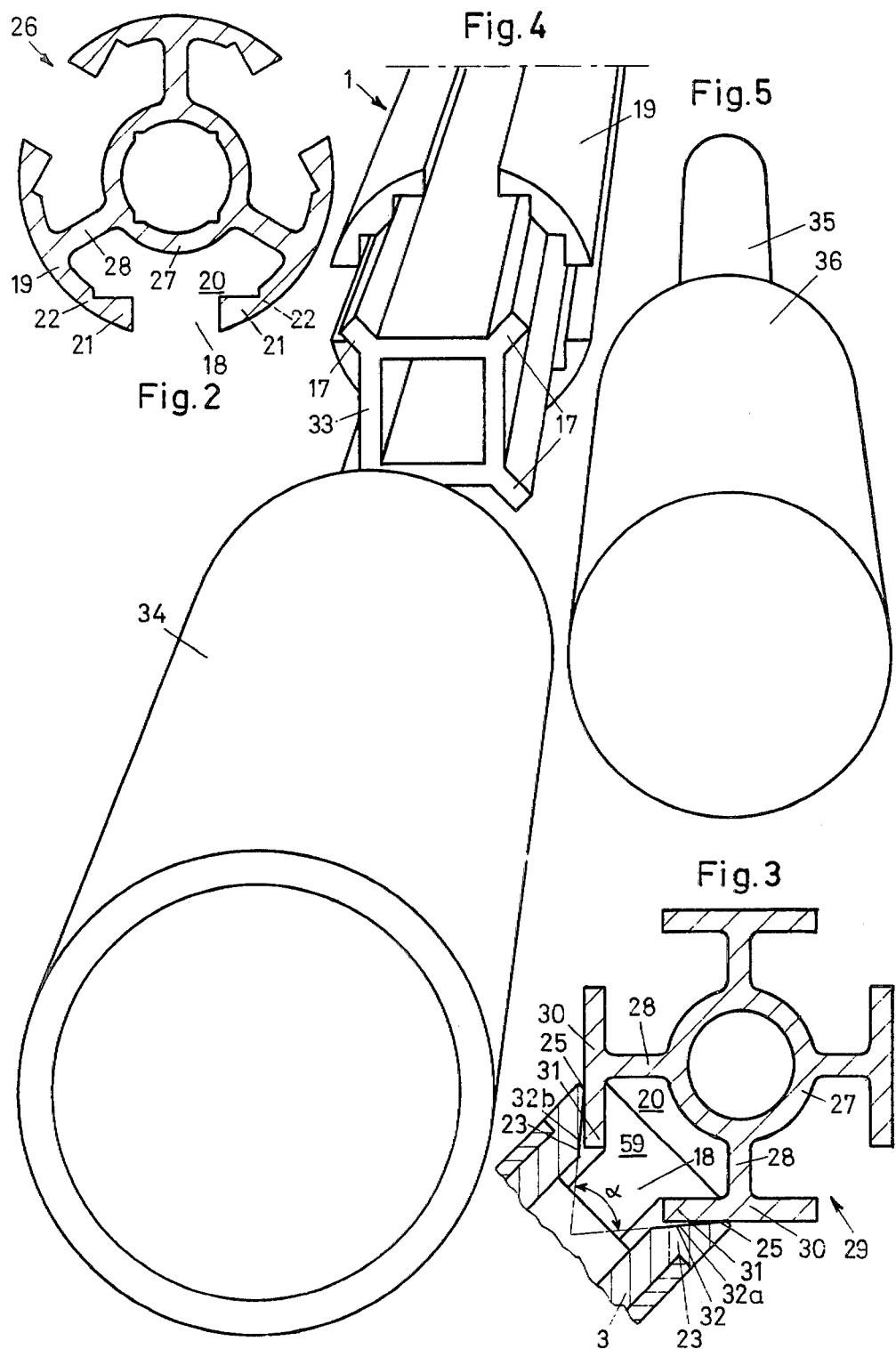

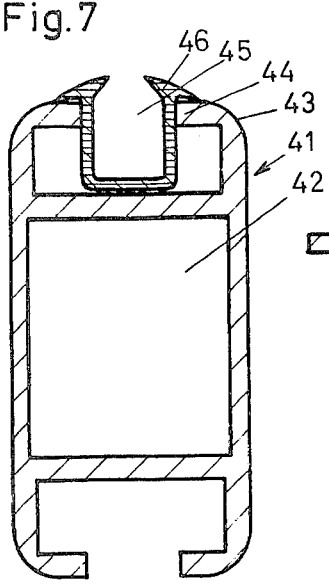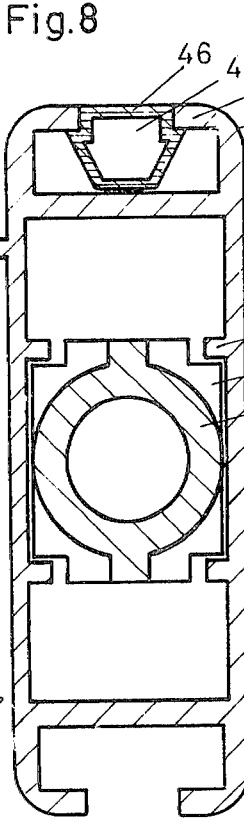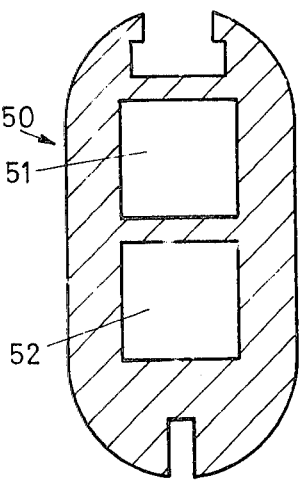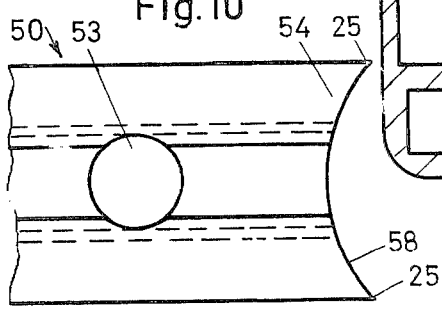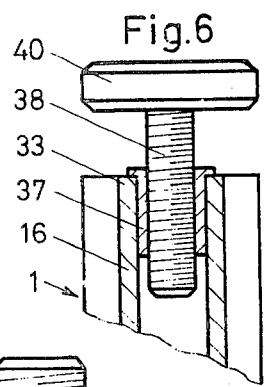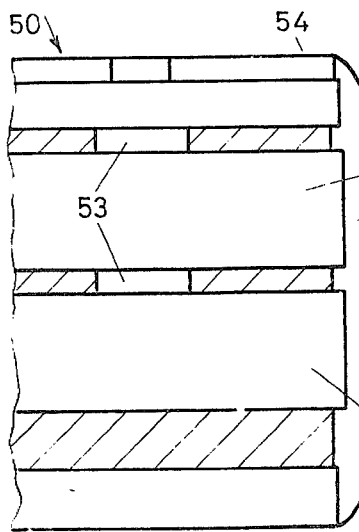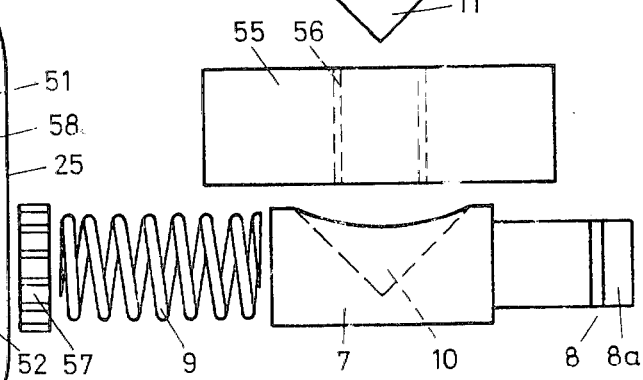

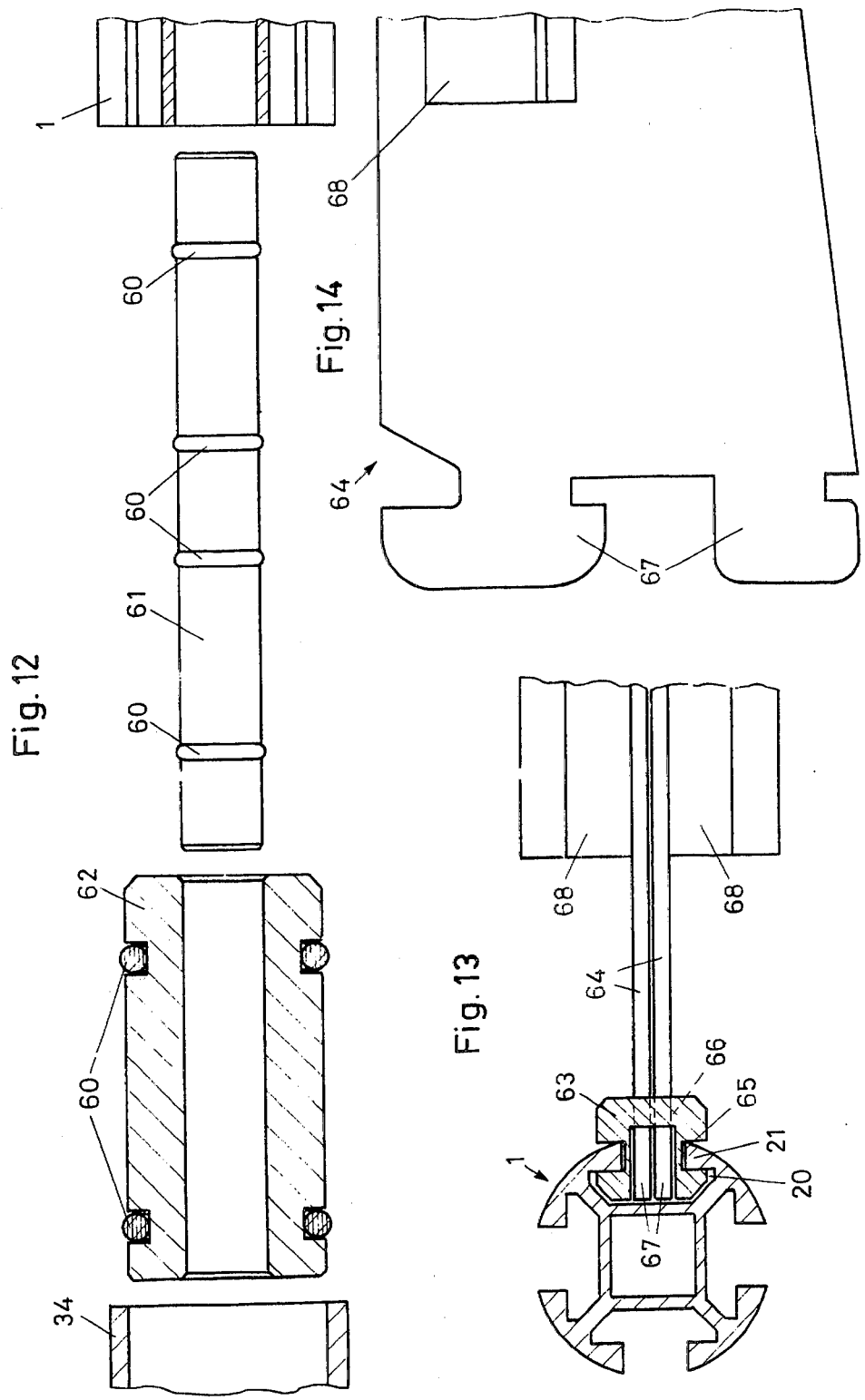

ELASTICALLY-DEFORMED ADJUSTABLE T-JOINT

BACKGROUND OF THE INVENTION

The present invention relates to a frame which has at least two sectional elements which are detachably interconnected and pressed against each other, the inner one being of a double-walled construction and having webs, which connect an inner section part to an outer one, longitudinal channels, longitudinal slots and either vanes or rails, which are separated from each other by the channels, and a bolt is provided which is anchored in one of the longitudinal slots and is rotatably and longitudinally displaceably mounted in the other sectional element and presses the vanes or rails against an end-face on the other sectional element.

In known frames of this kind, sectional parts are interconnected by longitudinally sliding an anchoring member in one of the sections, this anchoring member being anchored in a slot in the other section, and clamping is achieved by longitudinal displacement of the anchoring member. In such frames the sectional parts are not prevented from rotating relative to each other, which is particularly disadvantageous when the frame is being assembled. Even when the sectional parts are very firmly clamped they may slip, and this leads to displacement in the frame and to damage to the surfaces of the sectional parts which are usually anodized.

The fitting of sectional extensions and other parts of the frame is rendered difficult, and often leads to insufficient stability in the known frames.

SUMMARY OF THE INVENTION

The object of the invention is to provide a frame in which the above-mentioned disadvantages are avoided and in which the sectional parts can be firmly and non-slidably, yet detachably, connected to each other.

According to the invention, there is provided a frame comprising at least two sectional elements which are detachably interconnected and pressed against each other, the inner one being of a double-walled construction and having webs, which connect an inner section part to an outer one, longitudinal channels, longitudinal slots and either vanes or rails, which are separated from each other by the channels, and a bolt is provided which is anchored in one of the longitudinal slots and is rotatably and longitudinally displaceably mounted in the other sectional element and presses the vanes or rails against an end-face on the other sectional element, wherein the end-face and the outer surface of one of the sectional elements are differently shaped in such a manner that when the sectional elements are clamped together by the bolt, the end-face first bears against one of the sectional elements along lines of contact, and rotation of the elements relative to each other is prevented, and upon further clamping, the vanes or rails bear against the end-face by becoming elastically deformed.

BRIEF DESCRIPTION OF THE DRAWINGS

Some embodiments of the invention will now be described in greater detail by reference to the drawings, in which:

FIG. 2 is a section through a bar section;

FIG. 3 is a section through an alternate form of connection between two sectional elements;

FIG. 4 is a perspective view of a bar section and a tubular extension thereof, the two parts being shown separated;

FIG. 5 is a view of an element for connecting two sectional parts;

FIG. 6 is a section through part of the end of a sectional bar with a set-screw and end plate;

FIG. 7 is a section through a peripheral section;

FIG. 8 is a section through an alternate form of the peripheral section;

FIG. 9 is an end cross-sectional view through a garment rail sectional element;

FIG. 10 is a top plan view of the garment rail sectional element of FIG. 9;

FIG. 11 is a longitudinal section through the garment rail sectional element of FIG. 9, the parts to be inserted therein being shown in elevation and separated from each other;

FIG. 12 is a longitudinal section through a sectional bar and connecting elements for extending said bar, the parts being shown separated from each other;

FIG. 13 is a section through a sectional bar with an inserted slotted rail and two carriers; and FIG. 14 is a view of part of one of the carriers.

DESCRIPTION OF THE PREFERRED EMBODIMENTS

Figure 1:
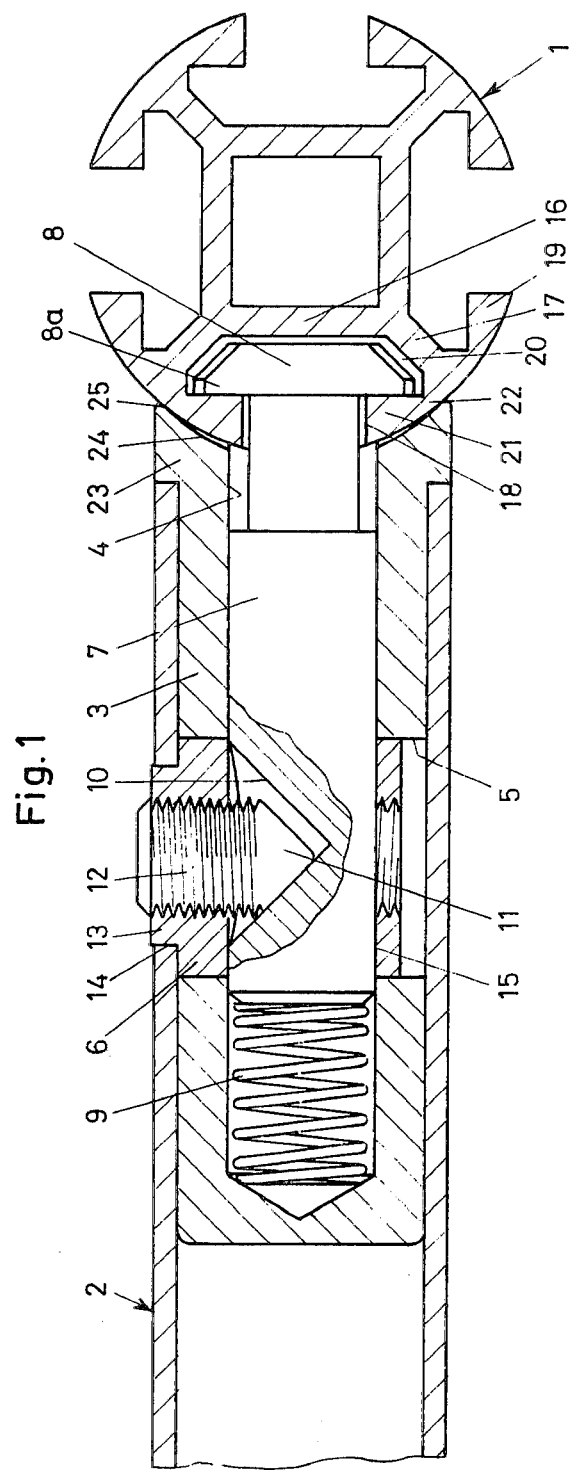
FIG. 1 is a section through a connection in the frame comprising the two sectional elements.

The frame illustrated in FIG. 1 has a sectional bar 1 and a peripheral sectional part 2 detachably connected to said bar. Inserted into the peripheral sectional part 2 is an insert core 3 having a longitudinal bore 4, closed at one end, and a transverse bore 5, said insert core being secured by means of an internally screw-threaded bush 6 fitted in the transverse bore 5. A bolt 7, provided with a T-shaped anchoring head 8, is mounted for longitudinal displacement in the longitudinal bore 4 of the insert core 3 and its end remote from the anchoring head bears against a spring 9 which is fitted in the closed end of the longitudinal bore 4.

Formed in the bolt 7 is a conical recess 10 into which projects the conical end 11 of a screw 12 fitted in the internally screw-theaded bush 6. A rim portion 13 of the bush 6 projects into a complementary opening 14 in the peripheral sectional element 2, and thus secures the insert core 3 in position. The bush 6 also has a transverse opening 15 for accommodating the bolt 7.

The sectional bar 1 is of double-walled construction, and an inner part 16 of the section, which is of square cross section, is connected by webs 17, projecting diagonally from its corners, to an outer circular part 19 of the section, which is interrupted by four longitudinal channels 18. In this construction of the sectional bar 1 there are defined four slots 20 of T-shaped cross-section which serve to accommodate the T-shaped anchoring head 8. Projections 8a of the anchoring head 8 engage two vanes 21 of the outer part 19 of the sectional bar, these vanes each having a tapered portion 22.

When the sectional bar 1 is connected to the peripheral sectional element 2, the internally screw-threaded bush 6 is first pushed into the transverse bore 5 in the insert core 3. The insert core 3 is then pushed into the peripheral sectional element 2, and the rim portion 13 of the bush 6 is pressed into the opening 14 in the peripheral sectional element 2 so that the insert core 3 is held fast. Thereafter, the spring 9 is fitted at the closed end of the bore 4, the bolt 7 is pushed into the insert core 3, is pressed against the spring 9 and is rotated until it can be secured by means of the screw 12. The anchoring head 8 projecting from the longitudinal bore 4 is then pushed into the slot 20 of the sectional bar 1, it being possible for the anchoring head 8 to be introduced, in one position, into the channel 18 incorporating the slot 20, and for the anchoring head to be turned through 90° so that its projections 8a can engage behind the vanes 21.

The end 23 of the insert core 3 that bears against the outer part 19 of the sectional element 1 has a rounded end-face 24, whose radius of curvature however is somewhat smaller than the corresponding radius of curvature of the outer part 19 of the sectional element 1. When the screw 12 is tightened, its conical tip 11 bears against the conical recess 10 in the bolt 7, so that the bolt is displaced axially against the pressure exerted by the spring 9 on the bolt 7, and during this displacement the end-face 24 moves into contact with the outer sectional part 19 along two lines of contact. In this stage of assembly the peripheral sectional element 2 canot be rotated relatively to the sectional bar 1 though it can be displaced in its longitudinal direction.

Upon further tightening of the screw 12, the vanes 21 are pulled towards the rounded end-face 24 by the anchoring head 8 until they bear fully against it. When this happens each of the vanes 21 is preferentially deformed at its tapered portion 22. By suitably shaping the vanes 21, and particularly by suitably selecting the thickness of the tapered portion 22, it is possible to ensure that the bolt 7 applies the necessary tensile force for bringing the two sectional elements tightly together.

The sectional elements 1 and 2, clamped together in this manner, can neither be turned or displaced longitudinally relative to each other, which is in contrast to the known sectional elements having planar bearing faces and wherein the point contact with low frictional adherence that occurs after clamping of the two parts together does not preclude relative displacement of the parts and damage to their surfaces.

In an alternate form of a sectional bar 26, an inner portion 27 of circular cross-section is connected to an outer circular part 19, interrupted by three longitudinal channels 18, by means of three projecting webs 28 spaced at 120° intervals. In this arrangement, slots 20 are again provided for receiving the T-shaped anchoring head 8, and the peripheral sectional element 2 is connected to the sectional bar 26 in the same way as in the first arrangement described above.

In a third arrangement, illustrated in FIG. 3, a sectional bar 29 has an inner part 27 of circular cross-section which is connected by four projecting webs 28 to an outer square part 30. The corners of this outer part 30 are removed so that rails 31, longitudinal channels 18 and slots 20 for receiving a bolt-head 59 are formed. The bolt head 59, which is of countersunk form, engages behind the rails 31 and pulls these towards the end 23 of the insert core 3. The end-face 32 of the insert core 3 that is presented to the rails 31 consists of two part-surfaces 32a and 32b which slope towards each other and form an acute angle alpha. When the countersunk head 59 is pulled back, an outer portion 25 of the end-face 32 first moves into contact with the outer part 30 of the sectional element 29 and, when further clamping takes place, the rails 31 are deformed and are pressed against the part-surfaces 32a and 32b.

The rails 31 are clamped between the bolt-head 59 and the end-face 32.

Other sectional bars of rectangular cross-section can of course be used. The only essential requirement is that the angle alpha formed by the part-end-faces is a little smaller than the angle between the outer walls of the sectional bar presented to the end-face. Other sectional bars that could also be used could be inteconnected by other combinations of the above-described inner and outer sectional portions.

The above-described and similar sectional bars can be lengthened in a simple manner or can be assembled with tubular and other frame parts. For connecting two sectional bars 1, the outer sectional portions 19 are removed from those of their ends 33 that are to be connected and are replaced by a length of tube 34 which is fitted on to the ends and forms the connection. The length of tube 34 has the same outside diameter as the sectional bars 1 and is centered by the webs 17 of said bars. FIG. 4 illustrates a sectional bar 1 with the outer portion 19 removed at the end 33 on to which the length of tube 34 is fitted.

Another readily formed connection can be achieved by means of a stud, not illustrated, which projects into the inner hollow sectional parts 16 of the two ends 33 and interconnects the sectional bars 1. A connector consisting of a stud 35 (FIG. 5) and a round bar part 36 can also be used, the stud 35 projecting into one end 33 of the sectional bar 1, and a length of tube 34 being pushed over the round bar 36.

FIG. 6 illustrates the sealed-off end of a sectional bar 1. An internally screw-threaded bush 37 is pressed into the inner hollow sectional part 16 of the end 33 and accommodates a set-screw 38. The set-screw 38 is provided with an end-plate 40.

FIGS. 7 and 8 illustrate in cross-section two other forms of peripheral sectional elements. One of the peripheral sectional elements, element 41 (FIG. 7), takes the form of a hollow section, a rectangular cavity 42 being provided to receive the insert core 3. The edges 43 of the peripheral sectional element 41 are rounded, and each of the short sides 44 is provided with a longitudinal channel 45. Sprung into one of the longitudinal channels 45 is a plastic sectional element 46 which is of U-shaped cross-section or is formed as a covering strip having a continuous periphery. In the case of the peripheral sectional element 47 (FIG. 8), parallel fins 48 are formed in the rectangular cavity 42, between which fins is pushed the insert core 3 provided with ribs 49.

Instead of or in addition to a peripheral sectional element, a garment rail sectional element 50 may, for example, be connected to the sectional bar 1. This arrangement is illustrated in FIGS. 9 to 11. The garment rail sectional element 50 encloses two cavities 51 and 52 which are of square cross-section and extend in the longitudinal direction and the sectional element 50 has a transverse bore 53. Its end 54, to be connected to the sectional bar 1, has a rounded end-face 58 having a radius of curvature which is slightly smaller than the corresponding radius of the outer portion of the sectional bar 1.

To establish the connection, a rod, of square cross-section and having a screw-threaded transverse bore 56, is first pushed into the upper cavity 51. A screw 12 with a conical tip 11 is screwed partially into the screw-threaded bore 56 through the transverse bore 53 and so secures the rod 55 in the garment-rail sectional element. A clamping element 57 is then pressed into the lower cavity 52, and finally a spring 9 is pushed into the lower cavity 52 until it abuts against the firmly secured clamping element 57. A round bolt 7, having a conical recess 10 and an anchoring head 8, can now likewise be pushed into the lower cavity 52 and secured by the screw 12. By means of this arrangement, the parts 7 and 55 are prevented from falling out and the bolt 7 is spring-mounted in its cavity 52, and this is of particular advantage when assembling the frame.

After the anchoring head 8 has been brought into its correct position in the slot 20 in the sectional bar, the screw 12 can be fully tightened. Here again, the end-face first bears against the sectional bar 1 along two lines of contact, so that the garment rail sectional element cannot tilt. In this arrangement too, further clamping leads to deformation of vanes 21 which are firmly clamped between the end 54 and the anchoring head 8. The frictional adherence of sectional elements interconnected in this manner is extremely great, and the elements cannot be moved relative to each other.

Another possible method of extending a sectional element 1 or of connecting it to tubular or other frames is shown in FIG. 12. One end of a plug 61, provided with O-rings 60 or other sealing elements, projects into the bore of the sectional bar 1. The other end of the plug projects into a cylindrical intermediate member 62, on whose outer periphery are likewise provided two O-rings 60. A tubular extension 34 is pushed over the intermediate member 62. The plug 61 could of course also be used directly for interconnecting two sectional elements 1. The use of O-rings or similar sealing elements compensates for the clearance between the parts to be connected. Furthermore, the parts to be connected can be readily pushed one into the other by rotation.

Slots 20 in the sectional bar 1 are suitable for receiving a slotted rail 63 into which transverse carriers 62 can be inserted (FIG. 13).

The slotted rail 63 is provided with two suitably shaped longitudinal channels which are associated with vanes 21, and the rail has spaced slots 66 into which are inserted projections on the carriers 64. The width of the slots 66 is so selected that two carriers can be fitted simultaneously and side-by-side on the sectional bar 1. The carriers 64 have reinforcing ribs 68 on one side. It is, of course, also possible to suspend only one carrier 64 on the sectional bar 1.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. A frame comprising: at least two sectional elements which are detachably interconnected and adapted to be pressed against each other, a first sectional element being of a double-walled construction and having webs, said webs connecting an inner section part of said first sectional element to an outer section part of said first sectional element, and said first sectional element further having longitudinal channels, longitudinal slots and vanes, said vanes being separated from each other by said longitudinal channels; and a bolt, which is anchored in one of the longitudinal slots, rotatably and longitudinally displaceably mounted in a second sectional element, said bolt presses said vanes against an end face of said second sectional element; said end face of said second sectional element and an outer surface of said first sectional element are differently shaped in such a manner that when said sectional elements are clamped together by said bolt, the end face bears against the outer surface of said first sectional element along lines of contact and rotation of the sectional elements relative to each other is prevented, further clamping causes said vanes to bear against said end face of said second sectional element by becoming elastically deformed.

2. A frame comprising: at least two sectional elements which are detachably interconnected and adapted to be pressed against each other, a first sectional element being of a double-walled construction and having webs, said webs connecting an inner section part of said first sectional element to an outer section part of said first sectional element, and said first sectional element further having longitudinal channels, longitudinal slots and vanes, said vanes being separated from each other by said longitudinal channels; and a bolt, which is anchored in one of the longitudinal slots, rotatably and longitudinally displaceably mounted in a second sectional element, said bolt presses said vanes against an end face of said second sectional element; said end face of said second sectional element and an outer surface of said first sectional element are differently shaped in such a manner that when said sectional elements are clamped together by said bolt, the end face bears against the outer surface of said first sectional element along lines of contact and rotation of the sectional elements relative to each other is prevented, further clamping causes said vanes to bear against said end face of said second sectional element by becoming elastically deformed, said end face of said second sectional element is curved and said first sectional element is a round sectional bar, the radius of said first sectional element being greater than the radius of curvature of the end face of said second sectional element, and said bolt is formed as an anchoring means and, through two projections formed thereon, presses the vanes against the end face of said second sectional element, the vanes becoming elastically deformed at least in tapered zones.

3. A frame comprising: at least two sectional elements which are detachably interconnected and adapted to be pressed against each other, a first sectional element being of a double-walled construction and having webs, said webs connecting an inner section part of said first sectional element to an outer section part of said first sectional element, and said first sectional element further having longitudinal channels, longitudinal slots and vanes, said vanes being separated from each other by said longitudinal channels; and a bolt, which is anchored in one of the longitudinal slots, rotatably and longitudinally displaceably mounted in a second sectional element, said bolt presses said vanes against an end face of said second sectional element; said end face of said second sectional element and an outer surface of said first sectional element are differently shaped in such a manner that when said sectional elements are clamped together by said bolt, the end face bears against the outer surface of said first sectional element along lines of contact and rotation of the sectional elements relative to each other is prevented, further clamping causes said vanes to bear against said end face of said second sectional element by becoming elastically deformed, said end face having two part-faces which slope toward each other to form an acute angle, said first sectional element being a sectional bar of square cross-section, the longitudinal channels and the longitudinal slots in the sectional bar are disposed at corners thereof, said vanes being in the form of rails, and a countersunk head of the bolt, which fits in the longitudinal slot, pulls the rails against the end face of said second sectional element.

4. A frame according to claim 1, wherein said end face of said second sectional element is formed on an inset core, said core being inserted in the second sectional element.

5. A frame comprising: at least two sectional elements which are detachably interconnected and adapted to be pressed against each other, a first sectional element being of a double-walled construction and having webs, said webs connecting an inner section part of said first sectional element to an outer section part of said first sectional element, and said first sectional element further having longitudinal channels, longitudinal slots and vanes, said vanes being separated from each other by said longitudinal channels; and a bolt, which is anchored in one of the longitudinal slots, rotatably and longitudinally displaceably mounted in a second sectional element, said bolt presses said vanes against an end face of said second sectional element; said end face of said second sectional element and an outer surface of said first sectional element are differently shaped in such a manner that when said sectional elements are clamped together by said bolt, the end face bears against the outer surface of said first sectional element along lines of contact and rotation of the sectional elements relative to each other is prevented, further clamping said vanes to bear against said end face of said second sectional element by becoming elastically deformed, said second sectional element is provided with a first and a second cavity, each of said cavities having a square cross-section, and each of said cavities extending in a lateral direction, and a transverse bore, said transverse bore passing through each of said cavities; a rod of square cross-section having a screw-threaded bore lies in said first cavity and is secured in position by a screw, said screw passing through each of said bores; and, a clamping element clamped in the second cavity, the bolt, which is inserted into said second cavity, presses a spring against said clamping element, and a conical tip of said screw engages a conical recess in said bolt.

6. A frame according to claim 1, wherein one end of said first sectional element has a screw-threaded bush pressed into it, and into said bush a set screw carrying an end plate is fitted.

7. A frame according to claim 1, further including a slotted rail pushed into one of the longitudinal slots of said first sectional element; at least one transverse carrier inserted in said slotted rail, each of said carriers having projections, said projections being inserted into vertically spaced slots in said slotted rail.

* * * * *